United States Patent [19]
Desilets

[11] 3,893,727
[45] July 8, 1975

[54] TWO-TONE PAINTING OF FLEXIBLE URETHANE FOAM AUTOMOBILE EXTERIOR PARTS

[75] Inventor: Kenneth G. Desilets, Dover, N.H.
[73] Assignee: McCord Corporation, Detroit, Mich.
[22] Filed: Oct. 30, 1973
[21] Appl. No.: 411,046

[52] U.S. Cl............... 293/71 R; 117/38; 117/45; 117/72; 117/75; 117/138.8 D; 161/160; 161/190
[51] Int. Cl.................... B60r 19/08; B32b 27/40
[58] Field of Search .......... 117/75, 138.8 D, 72, 45, 117/38, 98; 161/160, 190; 293/71 R

[56] References Cited
UNITED STATES PATENTS

| | | | |
|---|---|---|---|
| 3,447,949 | 6/1969 | Singer | 117/75 |
| 3,493,257 | 2/1970 | Fitzgerald et al. | 293/71 R |
| 3,639,147 | 2/1972 | Benefiel et al. | 117/75 X |
| 3,698,927 | 10/1972 | Sawyer | 117/72 X |
| 3,752,695 | 8/1973 | Finelli | 161/160 X |

Primary Examiner—Ralph Husack
Attorney, Agent, or Firm—McGlynn and Milton

[57] ABSTRACT

Automobile exterior flexible plastic parts, such as automobile bumpers of microcellular urethane foam, are given a two-tone finish without a loss in their ability to meet certain simulated use tests by first priming the plastic surface to be coated; applying a first coat of one color and of a heat curing thermosetting resin-type; exposing the thus coated article to a very short baking cycle to set or dry, but not cure, the coating; then applying a second coat of a different color and also of a heat-curing thermosetting resin-type; and then finally curing the thus two-toned article for the full baking cycle normally applicable to the thermosetting resin systems used. The first coat preferably contains considerably more cure catalyst than that contained in the second coat, as an aid in controlling the extent of the partial cure of the first coat during the first baking thereof.

4 Claims, 1 Drawing Figure

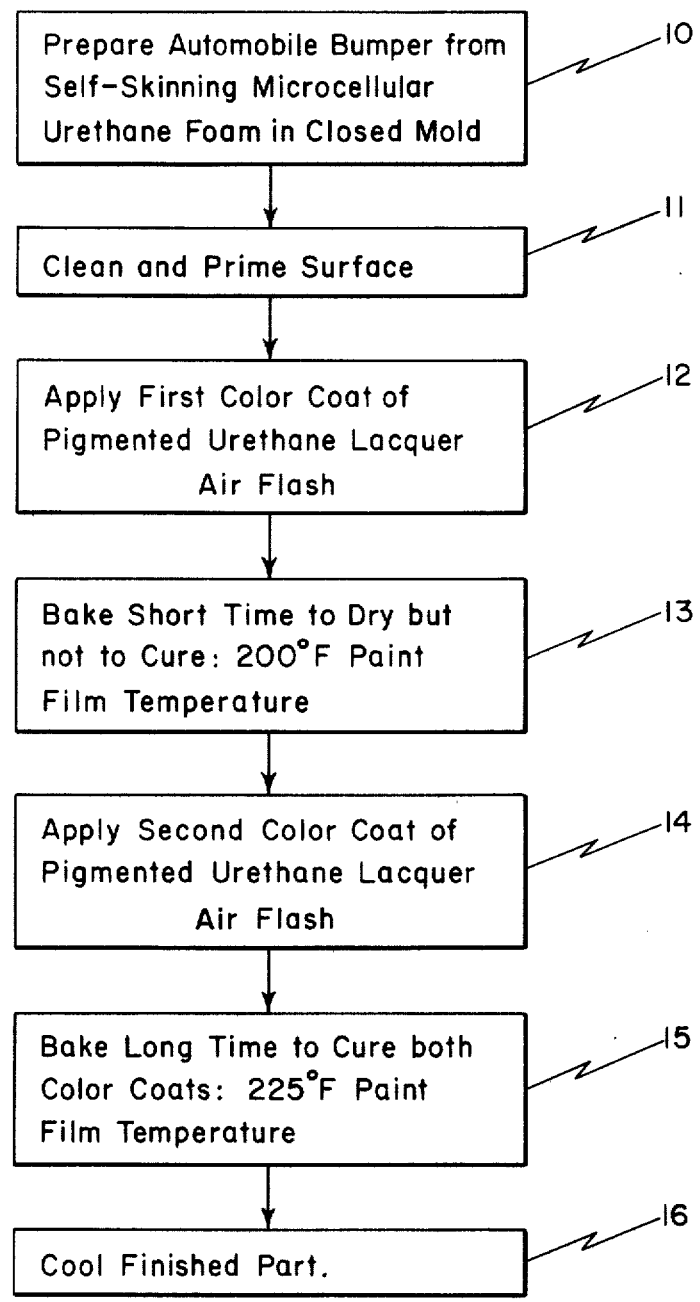

TWO-TONE PAINTING OF FLEXIBLE URETHANE FOAM AUTOMOBILE EXTERIOR PARTS

INTRODUCTION

Certain automobile interior and exterior parts have been made for some years from molded flexible plastics protectively decorated with pigmented top coats a few mils thick. Recently, automobile designers have desired that such items as self-skinning urethane foam automobile bumpers be two-toned. For example, they wish a portion be dull black to serve as a sight shield and another portion of the bumper to be of a color such as lime-metallic.

This desideratum has sorely tried the production capabilities of the suppliers of such parts. The simulated environmental tests that an exterior automobile part must meet are in themselves quite severe, e.g. those tests for color stability, weatherability, flex-cracking, impact energy absorption, etc. These tests, coupled with the desire for color match and two-tone effects seemed, for a time, impossible to satisfy.

The conditions of expected use as typified by the simulated environmental tests more or less dictate that a properly cured thermosetting resin system be used to top coat the urethane foam articles, but such thermosetting resin systems mandate a high temperature cure if acceptable production schedules are to be realized. High temperatures cause some degradation of urethane foams and when two-toning is attempted the two cure cycles required, one for each coat, can have in total a very debilitating effect on the foam. Double baking of the first coat adversely effects, of course, its properties. Also, double baking unduly prolongs production schedules.

THIS INVENTION

The present invitation is a process of two-tone coating molded flexible articles such as those of the natural and/or synthetic rubbers, and the urethanes, and the articles produced thereby. The present process is characterized by the use of first and second pigmented thermosetting resin top coats of certain compositions and requiring baking to cure, and by a merging of the two bake cycles normally associated with each color in such a manner as to minimize thermo-degradation of the article while securing adequate cures.

Specifically, this invention is directed to the manufacturer of two-tone foam that will satisfy certain rigid use-simulating tests, namely, those concerned with color fastness, flex-cracking, (particularly initial flex; −20°F flex and flex after weathering), weatherability, solvent resistance, and wear resistance.

If the surface coatings were not required to be flexible, the problem of securing proper cures of the two would not be as severe. As it is, each coat by proper formulations and curing must be given a sufficient cross-linked structure to hold the pigment and weather well but not such a hard cure as to unduly diminish its extensibility and resistance to flex-cracking. It is important to note that this invention is particularly concerned with top coatings that are not only flexible but are alos extensible so that, inter alia, they are more amenable to temperature cycling.

Normally, an enamel of this type will require baking in an ambient temperature in an excess of 225°F for times well in excess of 15 minutes, for example, 40 minutes at 250°F. If each of the two or more coatings that may be used on such urethane articles were given such bake treatments separately, the resulting degradation to the urethane foam substrate would be extremely undesirable and the production time involved would be intolerable. In addition, in a case of color-overlap, it is questionable whether the second coat would properly bond to the first.

In the present invention, the enamel used for the first color coat is preferably catalyzed, with an added amount of catalyst (beyond that contained in the enamel as supplied), e.g. a free radical acid-type catalyst is added to the enamel as supplied. The solvent-vehicle-catalyst coating system used for the first coat is selected and controlled to permit the first coat to be "set" as opposed to "cured", with a relatively brief exposure to high temperatures. The first coat is dry to touch but not so cured that it will pass the xylene rubbing test. Over cure of the first coat will prevent good intercoat adhesion.

The setting of the first coat is sufficient to permit the second color to be applied contiguous to ("wet to dry") or even overlapping (wet on dry) the first color without deliterious results such as chipping, alligatoring, and or bleed-through. After the second coat is applied the two-toned article is baked at an elevated temperature for the normal cure time to completely cure both color coats and enable them to pass the simulated enviromental tests, such as color fastness and flex-cracking. Excellent intercoat adhesion is obtained in case of overlapping of the coats.

This merging of the two bake cycles permits a two-tone flexible urethane foam article to be manufactured with bake times of only 110 to 130 percent of those used for single color articles. Thus, thermal degradation of the urethane foam is minimized and acceptable production time schedules can be realized.

THE DRAWING

The drawing is a flow diagram of the significant steps of the process of this invention.

In the drawing, at 10, a flexible plastic automobile bumper is prepared from a self-skinning microcellular urethane foam in a closed mold.

The surface of the bumper is cleaned and primed at 11.

The first color coat of the thermosetting or urethane lacquer containing pigment is applied in step 12, usually to a dry thickness in the range of 0.8 to 3 mils for a black sight shield.

In step 13, after an air flash, the first coat is baked for a short time to dry but not cure it, the paint film temperature being kept below about 200°F.

At 14, the second color coat of a pigmented urethane lacquer is applied and air flashed. The film thickness, dry, can be 1 to 4 mils.

Thereafter in step 15, the two-tone article is baked for a relatively long time to thoroughly cure both paint films, the temperature of the films being raised to above 225°F.

Finally, at 16, the finished part is cooled and readied for shipping.

EXAMPLES

Test blocks simulating self-skinning microcellular urethane foam automobile bumpers are prepared from the following composition:

| Room Temperature Prepolymer | Parts |
|---|---|
| 1000 mol. wt. diol (P-1010⁽¹⁾) | 46.0 |
| TDI 80/20 | 20.1 |
| Benzoyl Chloride | 0.1 |

Diol and TDI mixed together and allowed to react for 50 minutes, then benzoyl chloride added and held for 10 minutes.

| Polyol Blend | Parts |
|---|---|
| 2000 mol. wt. polyol (P-2010⁽¹⁾) | 29.66 |
| Aromatic diol (C-100⁽²⁾) | 1.26 |
| Aromatic polyamine (Curethane 103⁽²⁾) | 9.30 |
| Stannous octoate soln. (26%) ⁽³⁾ | 3.00 |
| Freon 11 ⁽⁴⁾ | 5.50 |
| Black (blended with a polyol) ⁽⁵⁾ | 1.20 |
| | 49.92 |

Ingredients are simply blended.

Notes:
(1) Wyandotte Chemical
(2) Upjohn Company
(3) Witco Chemical Corp., C-7
(4) E. I. DuPont de Nemours & Co.
(5) United Finish 5020 Black The prepolymer and polyol blend are mixed thoroughly in the ratio of 117 parts prepolymer/100 parts blend and immediately placed in a closed mold and allowed to react.

The test blocks are 4 × 16 × ¼ inches. The surface of the blocks are primed with Pittsburgh Plate & Glass (PPG hereafter) No. 32906 Primer, as supplied. The blocks are preheated to about 125°F, cleaned with dry deionized air (they are not wiped) and then are hand sprayed with the primer to a dry thickness of coating of 1.0± 0.2 mils. After spraying, they are air flashed for about 15 minutes and then baked 30 minutes at 200°F (oven air temperature), or 6 minutes at 225°F.

A low gloss black, to simulate the sight shield area, is then applied as the first coat. This is PPG's Durethane 150. The paint is first mixed with 1.25 weight percent, on unthinned paint, of a 25 weight percent solution of phenyl acid phosphate in butyl alcohol. It is then diluted to 33–35 second vicosisty (No. 1 Zahn Cap) with a solvent blend of 50% Xylene-50% toluene, and filtered.

The black paint is applied with an electrostatic or syphon-type spray gun using a 150–160 gram/minute delivery rate with 60 psi butt pressure and three passes with 1 minute air flash between coats to achieve a total dry film thickness of 1.5 to 1.8 mils. The sample is then air flashed for 15 minutes followed by baking 10 minutes at an oven air temperature of 245°± 5°F.

The second high gloss coat is PPG's Durethane 100, which is supplied already pigmented with the specified color and is applied as supplied. The sight shield area is masked with tape as desired and the paint is applied as above in three passes to a total dry film thickness of 1.8 to 2.0 mils. The mask is removed, the part air flashed for 15 minutes, then baked 40 minutes at an oven air temperature of 245°± 5°F. It is then cooled for 2 minutes.

The two lacquers used, while referred to as urethane lacquers, are believed to be more properly identified as polyester-extended melamine enamels.

Nine samples of each color are prepared. Samples prepared as above were tested according to Specification ESB-M2P105-A of the Ford Motor Company, which is publicly available to all suppliers.

Tables I and II give the results of the tests for five high gloss colors.

Table I

Laboratory Test Results

Paint System: Low gloss black sight shield/High gloss 1972 Durethane 100 colors.

| | | White | Pewter | Ivy Bronze | Red | Lime Met. |
|---|---|---|---|---|---|---|
| 3.5.2 | Adhesion | Pass | Pass | Pass | Pass | Pass |
| 3.5.4 | Initial Flexibility | '' | '' | '' | '' | '' |
| 3.6.1 | Water Resistance | | | | | |
| | High Gloss Color | '' | '' | '' | '' | '' |
| | Low Gloss Color | blistered | blistered | '' | '' | '' |
| 3.6.2 | 400 Weatherometer Hours | | | | | |
| | High Gloss Color | dulled sl. cracking | dulled cracked | dulled | dulled | dulled |
| | Low Gloss Color | Pass | Pass | Pass | Pass | Pass |
| 3.6.3 | Thermal Shock | Pass | Pass | Pass | Pass | Pass |
| 3.6.4 | Water & Soap Resistance | '' | '' | '' | '' | '' |
| 3.6.5 | Acid Spotting | '' | '' | '' | '' | '' |
| 3.6.6 | Gasoline Resistance | '' | '' | '' | '' | '' |
| 3.6.7 | Oil Resistance | '' | '' | '' | '' | '' |
| 3.6.8 | Scuff Resistance | '' | '' | '' | '' | '' |
| 3.6.9 | Heat Resistance | '' | '' | '' | '' | '' |
| 3.6.10 | Chip Resistance | '' | '' | '' | '' | '' |
| | 20 F° Cold Flex | '' | '' | '' | '' | '' |

Note: Test results refer to both, high and low, gloss colors, unless otherwise specified.

Table II

1600 Hour Weathermeter
&
Florida - 6 Month Outdoor
Test Results

| Tests | White/Black | Pewter/Black | Red/Black | Lime Met./Black | Ivy Bronze/Black |
|---|---|---|---|---|---|
| Weatherometer 1600 Hours | | | | | |
| Gloss | sv. loss/app.loss | sv.loss/app.loss | sv.loss/app.loss | sv.loss/applloss | sv.loss/app.loss |
| Color | app.chg./sv.gray | app.chg./sv.gray | app.chg./sv.gray | app.chg./sv.gray | app.chg./sv.gray |

Table II—Continued

|  | 1 600 Hour Weathermeter & Florida - 6 Month Outdoor Test Results | | | | |
|---|---|---|---|---|---|
| Tests | White/Black | Pewter/Black | Red/Black | Lime Met./Black | Ivy Bronze/Black |
| 2" Flex test* | O.K./O.K. | cracked/O.K. | O.K./O.K. | cracked/O.K. | s.cracks/O.K. |
| Florida 6 months |  |  |  |  |  |
| Gloss | — | — | app.loss/app.loss | evi.loss/app.loss | sl.loss/app.loss |
| Color | — | — | sl.chg./evi.chg. | sl.chg./evi.chg. | sl.chg./app.chg. |
| 2" flex test | — | — | O.K./O.K. | O.K./O.K. | O.K./O.K. |

*Samples are graded on flexibility on 3rd flex.
Abbreviations used in the Tables:
met. = metallic     s = small
app. = appreciable     sl. = slight
chg. = change     sv. = severe
evi. = evident The above drying or curing time and oven temperatures to which the coatings are subjected do not, of course, accurately state the actual temperatures experienced by the coatings. Tests have been conducted to determine the true temperatures of the coatings by the use of thermo-foil thermocouples placed between the primer and the top coats. It was found that this type of urethane lacquer needs to be carried to 230°F+ to be completely cured, which is achieved in the full bake given after application of the second coat. The short bake, described above, given the first coat raises the temperature of the coating to about 200°F, some 25°–50°F below that temperature required for a complete cure. The combined effect of the catalyst and the short bake given to the first coat is sufficient to render it dry to touch but not such that it will pass the Xylene rubbing test. It is not cured so hard that the second coat cannot bond to it.

What is claimed is:

1. In the finishing of the surface of an article of a flexible plastic with a well adhered flexible, extensible, and pigmented top coat having thermosetting resin vehicle requiring heating to a cure temperature to cure, wherein said article after application of said top coat is baked at an ambient temperature substantially in excess of said cure temperature for a substantial period of time; the improvement permitting two-tone finishing of said article with minimum degradation of said flexible plastic, comprising in combination the steps of:
   1. Applying a first paint coat to said surface composed of:
      a. thermosetting resin vehicle
      b. pigment
      c. solvent
      d. a cure catalyst for said vehicle;
   2. Baking the thus coated article for a short period of time to dry but not completely cure said first paint coat;
   3. Immediately applying to said surface a second paint coat composed of:
      a. a thermosetting resin vehicle
      b. a pigment substantially different from the pigment of step 1
      c. a solvent;
   4. And baking the thus twice coated article for a substantial period of time at an oven temperature in excess of said cure temperature to cure both said first and second paint coats.

2. In the finishing of the surface of an automobile exterior part of a self-skinning microcellular urethane foam with a well adhered flexible, extensible, and pigmented top coat having thermo-setting resin vehicle requiring heating to a cure temperature to cure, wherein said automobile exterior part after application of said top coat is baked at an ambient temperature substantially in excess of said cure temperature for a substantial period of time; the improvement permitting two-tone finishing of said article with minimum degradation of said microcellular urethane foam, comprising in combination the steps of:
   1. Applying a first paint coat 0.8 to 3 mils thick, dry basis, to said surface composed of:
      a. a thermosetting polyester-extended melamine resin vehicle
      b. pigment
      c. solvent
      d. a cure catalyst for said vehicle in an amount substantially greater than that, if any, contained in a second paint coat, described in step 3, as an aid in controlling the extent of partial cure of said first paint coat;
   2. Baking the thus coated article for a short period of time to dry but not completely cure said first paint coat;
   3. Immediately applying to said surface said second paint coat 1 to 4 mils thick, dry basis, composed of:
      a. a thermosetting polyester-extended melamine resin vehicle
      b. a pigment substantially different from the pigment of step 1
      c. a solvent;
   4. And baking the thus twice coated article for a substantial period of time at an oven temperature in excess of said cure temperature to cure both said first and second paint coats.

3. The process of claim 2 wherein said cure temperature is above 225°F, said first paint coat is baked at oven temperatures in excess of 225°F for a time less than 15 minutes raising the temperature thereof to a temperature less than 200°F but adequate to dry said first paint coat to touch but insufficient for it to pass the Xylene rubbing test, and said second paint coat is baked at an oven temperature in excess of 225°F for a time longer than 15 minutes raising the temperatures of both paint coats to above 225°F sufficient to thoroughly cure the said paint coats.

4. An automobile bumper made by the process of claim 3 and passing the following specifications of ESB-M2P105-A of the Ford Motor Company: Initial Flexibility: −20°F Cold Flexibility; Weathermeter 1600 Hour Flexibility; Gasoline and Oil Resistance; and Scuff Resistance.

* * * * *